United States Patent
Su

(10) Patent No.: US 12,054,346 B2
(45) Date of Patent: Aug. 6, 2024

(54) APPARATUS FOR AUTOMATIC SEPARATION OF STACKED, NESTED CONTAINERS

(71) Applicant: FuSheng Su, Wuhan (CN)

(72) Inventor: FuSheng Su, Wuhan (CN)

( * ) Notice: Subject to any disclaimer, the term of this patent is extended or adjusted under 35 U.S.C. 154(b) by 317 days.

(21) Appl. No.: 17/717,915

(22) Filed: Apr. 11, 2022

(65) Prior Publication Data

US 2023/0322507 A1 Oct. 12, 2023

(51) Int. Cl.
  *B65G 59/10* (2006.01)

(52) U.S. Cl.
  CPC .... *B65G 59/108* (2013.01); *B65G 2201/0235* (2013.01)

(58) Field of Classification Search
  CPC .......... B65G 59/108; B65G 2201/0235; B65G 33/06; B65G 59/066; B65G 59/102; B65G 57/307; B65G 59/10; B65G 33/04; B65B 21/20; B65B 35/06
  See application file for complete search history.

(56) References Cited

U.S. PATENT DOCUMENTS

| | | | | |
|---|---|---|---|---|
| 4,804,108 A * | 2/1989 | Ficken | ..................... | A47F 1/085 221/241 |
| 9,250,256 B2 * | 2/2016 | Lukhaub | .............. | B65G 59/105 |
| 2007/0278240 A1 * | 12/2007 | Dideriksen | .......... | B65G 59/105 221/289 |

FOREIGN PATENT DOCUMENTS

| | | | | | |
|---|---|---|---|---|---|
| CH | 446403 | A * | 11/1967 | .......... | B65G 59/066 |
| CN | 109250513 | A * | 1/2019 | .......... | B65G 59/066 |
| DE | 1902941 | A1 * | 8/1970 | .......... | B65G 59/108 |
| DE | 2641072 | A * | 3/1978 | .......... | B65G 59/102 |
| GB | 2094277 | A * | 9/1982 | .......... | B65G 59/066 |
| JP | 6553565 | B2 * | 7/2019 | ............. | B65G 33/06 |
| WO | WO-2019077564 | A1 * | 4/2019 | ............. | A47F 1/085 |

* cited by examiner

*Primary Examiner* — Gregory W Adams
(74) *Attorney, Agent, or Firm* — SALIWANCHIK, LLOYD & EISENSCHENK

(57) ABSTRACT

The invention relates to a container separator apparatus for automatically separating stacked rimmed containers. The container separator apparatus utilizes at least one spindle comprising a rotation cylinder, a screw-toothed cylinder, and a semi-circular wedge that are arranged to operate synchronously as the spindle rotates. The stacked rimmed containers can be placed in a rack, which can be inverted and placed against the rotation cylinders. As the at least one spindle rotates the rims of the containers engage with the thread of the screw-toothed cylinder, which carries the containers downward towards the semi-circular wedge. As the containers pass the rotating semi-circular wedge, the narrow end of the wedge inserts between the rims of two adjacent containers and gradually separates the containers to the bottom container can fall off the stack of containers in an upright position.

4 Claims, 2 Drawing Sheets

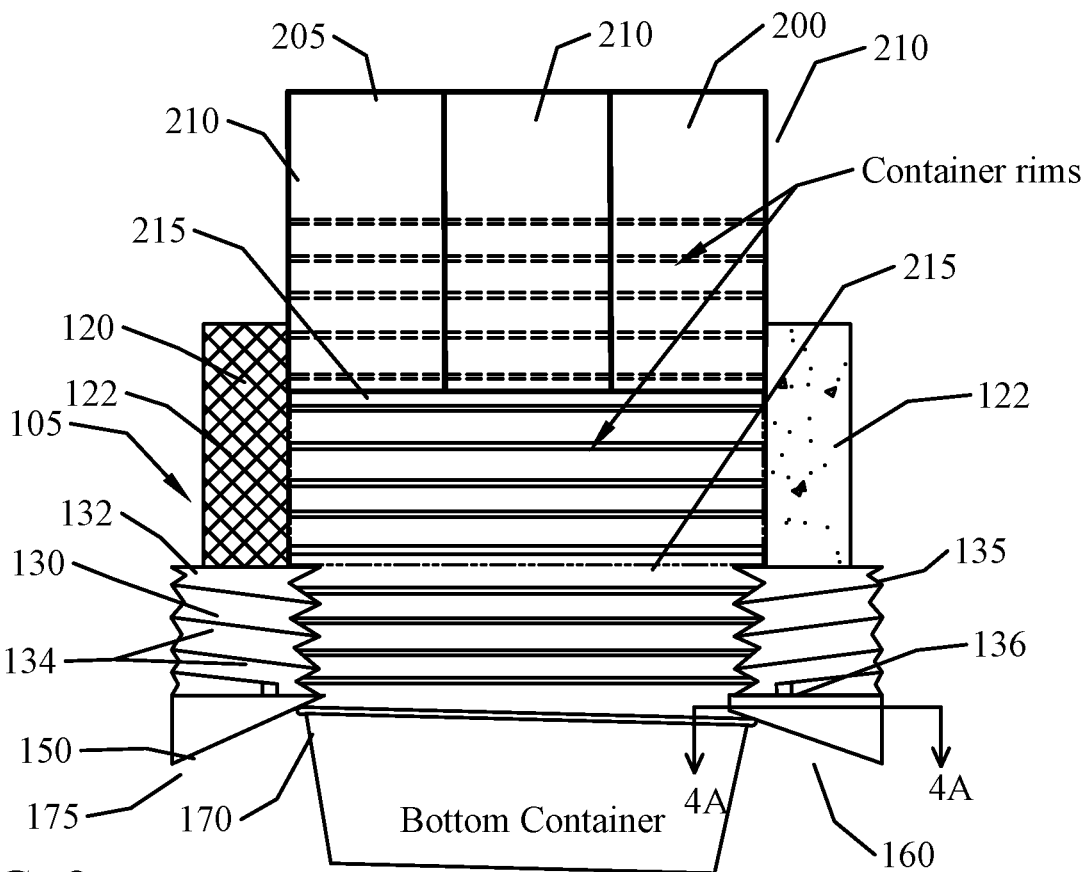
FIG. 3
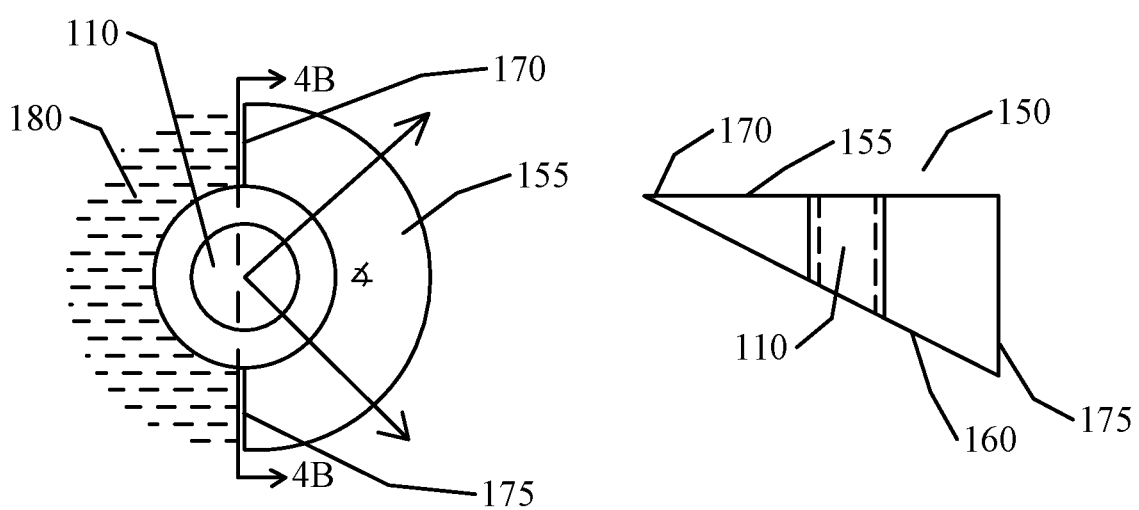
FIG. 4A
FIG. 4B

APPARATUS FOR AUTOMATIC SEPARATION OF STACKED, NESTED CONTAINERS

BACKGROUND OF THE INVENTION

There are numerous industries that utilize stacked or nested containers to store, transport, and/or distribute various items. It can be beneficial for the material of stacked containers to create some minimal friction between the containers, which can aid in stacking, transport, and packaging. Containers are typically separated prior to use, which can be more difficult and time-consuming because of the frictional fit. An apparatus for separating stacked, nested containers is not currently available. There is a need in industries that utilize such containers for an apparatus that can automatically and continuously separate stacked, nested containers. Such automation would improve production efficiency, while reducing labor and operating costs.

BRIEF SUMMARY OF THE INVENTION

The subject invention provides an apparatus for automatically separating containers that are stacked or nested, particularly containers with a rim. The subject invention can advantageously utilize the friction between containers. In one embodiment, the separation apparatus of the subject invention has multiple rotatable spindles that each have a screw-toothed cylinder with a rotation cylinder above and a semi-circular wedge below, which are arranged to synchronously operate when rotated. The semi-circular wedge has a sloped bottom side, such that the thickness increases between a narrow end and a wide end.

A plurality of stacked containers can be arranged within a rack that can be inverted and placed between and in contact with the rotation cylinders and supported on the screw-toothed cylinders, which positions the containers in an upright position with upward positioned rims. A motor can rotate one or more gears that are operably connected to the spindles.

Rotation of the spindles simultaneously rotates the rack against the rotation cylinders, as well as the stacked containers. As the rimmed containers, by force of gravity, move downwards towards the screw-toothed cylinder, the rims of the containers engage with the thread of the screw-toothed cylinders, which carries the containers downwards towards the semi-circular wedge. The differing diameters of the rack and spindles causes them to rotate at different speeds, where the spindle rotates faster than the rack and the containers therein.

As the containers rotate downward on the screw-tooth cylinder and towards the rotating semi-circular wedge, the thin end of the semi-circular wedge can insert between the rims of two adjacent containers. The bottom slope of the semi-circular wedge pushes against the rim of the bottom container as the semi-circular wedge rotates, which increases the space between the containers or wedges apart the adjacent containers. When the semi-circular wedge completes a rotation, an open side opposite to the semi-circular wedge allows the bottom container to fall or drop away from the upper container.

Continued rotation of the spindle rotates the screw-toothed cylinder and moves another container from the plurality of stacked containers down to the semi-circular wedge. The container is held in place by the container just above, until the semi-circular wedge begins another rotation to insert between the rims of the next two containers releasing the next bottom container, so that it falls or drops away from the container above. The continuous rotation of the spindles can continuously separate and release containers.

BRIEF DESCRIPTION OF THE DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention.

FIG. 3 is a front view of an embodiment of container separator apparatus, according to the subject invention, which demonstrates in particular the position of the screw-toothed cylinder and the semi-circular wedge. Line 4B-4B indicates the view seen in FIG. 4B.

FIGS. 4A and 4B shows an embodiment of a semi-circular wedge, according to the subject invention. FIG. 4A shows a top view of a semi-circular wedge taken along line 4A-4A in FIG. 3. FIG. 4B shows cross-section view of a semi-circular wedge taken along line 4B-4B in FIG. 4A.

DETAILED DESCRIPTION OF THE INVENTION

Figure 1:
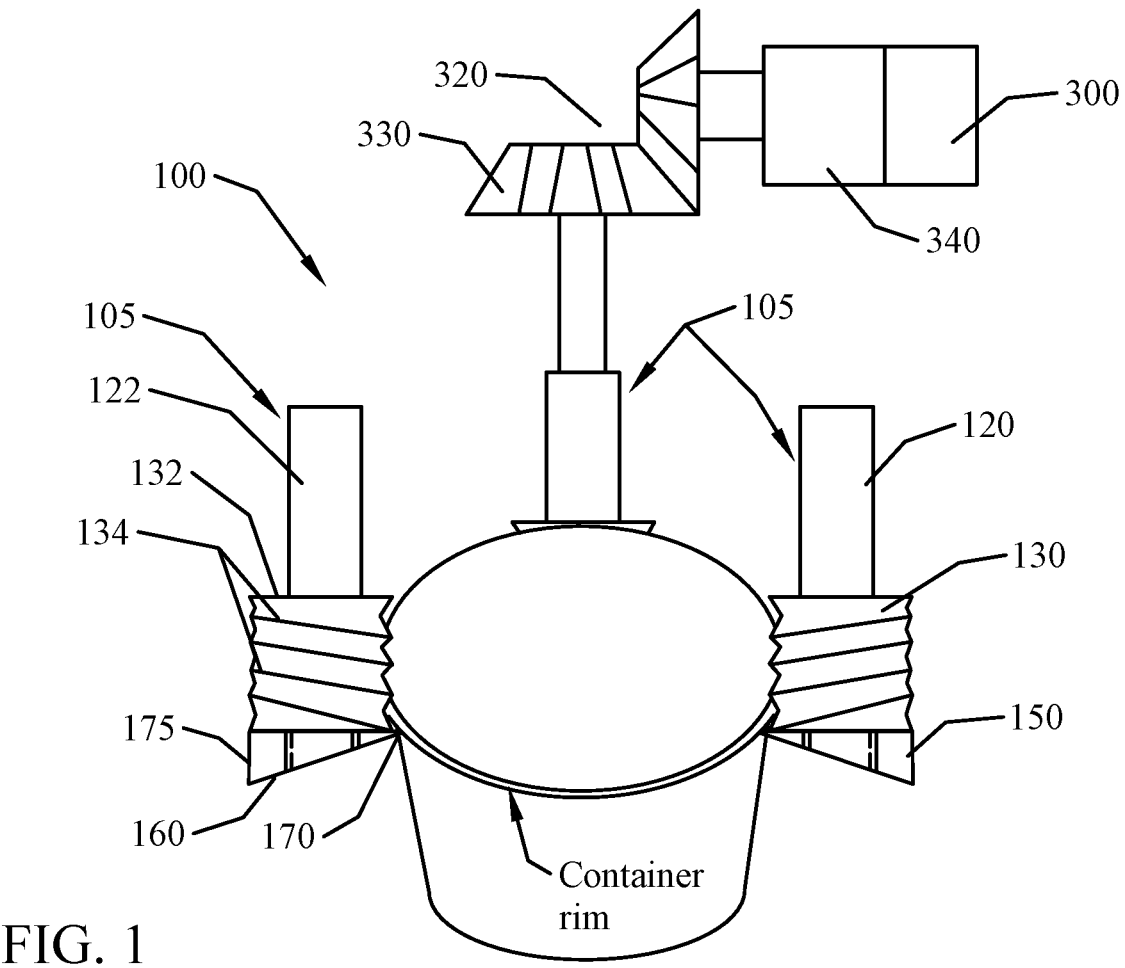
FIG. 1 is schematic of an embodiment of the container separator, according to the subject invention.
Figure 2:
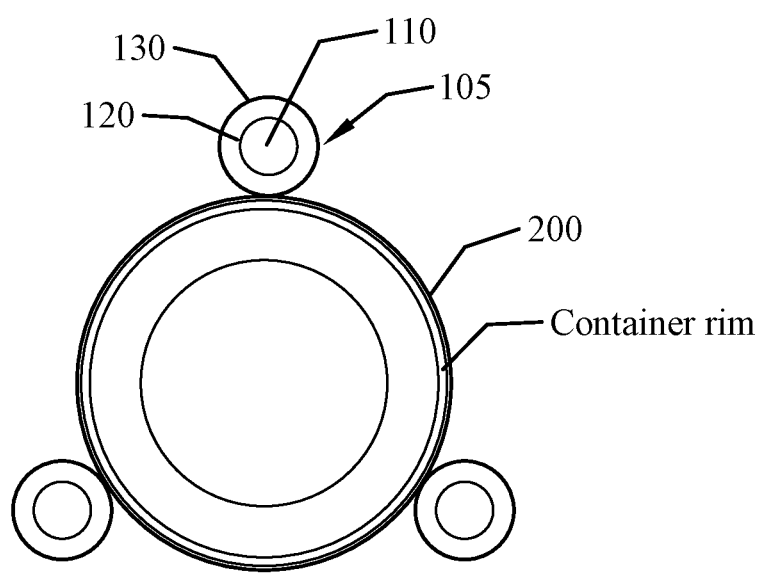
FIG. 2 is a top view of an embodiment of a container separator, according to the subject invention, illustrating stacked containers being rotated by screw-toothed cylinders.

The subject invention pertains to an apparatus and method for separating a plurality of stacked containers. More specifically, the subject invention provides one or more embodiments of a motorized apparatus for continuous, automatic separation of stacked containers, or similar items. The components of the apparatus can operate synchronously and continuously to separate containers or can be used intermittently to separate containers "on-demand" or individually.

The subject invention is particularly useful in industries that utilize multiple plastic or paper containers, in particular containers that have a defined rim, such as, for example, disposable containers used to store, transport, and serve food, beverages, and similar items. While the subject application describes, and many of the terms herein relate to, a use for separating rimmed containers that are stored in stacked and nested fashion, the subject invention is not limited to such use and can be utilized with other stacked or adjacent objects that are separated for use.

In the description that follows, a number of terms pertaining to the invention are utilized. In order to provide a clear and consistent understanding of the specification and claims, the following definitions are provided.

As used herein, the term "container" or "rimmed container" refers to an object that has an outer projecting rim at or near an open end and can be seated or nested within a similar object so that a plurality of such objects are stacked or nested, one within another, to provide "stacked containers."

As used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

The terms "substantially" and "substantially shown," for purposes of this specification, are defined as being within "at least 90%," of the stated value or condition.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. Use of the term "comprising" contemplates other embodiments that "consist" or "consist essentially of" the recited component(s).

Any reference in this specification to "one embodiment," "an embodiment," "example embodiment," "further embodiment," "alternative embodiment," etc., is for literary convenience. The implication is that a particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Finally, as used herein, terms indicating relative direction or orientation, including but not limited to "upper", "lower", "top", "bottom", "vertical", "horizontal", "outer", "inner", "front", "back", and the like, are intended to facilitate description of the present invention by indicating relative orientation or direction in usual use, and are not intended to limit the scope of the present invention in any way to such orientations or directions.

The figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

Reference will be made to the attached Figures on which the same reference numerals are used throughout to indicate the same or similar components. With reference to the attached Figures, which show certain embodiments of the subject invention, it can be seen in FIG. 1 that embodiments of a container separator apparatus 100 of the subject invention comprise one or more spindles 105 having an upper rotation cylinder 120, screw-toothed cylinder 130 with a larger diameter centered and fixedly attached below the upper rotation cylinder and semi-circular wedge 150 with a larger diameter than the screw-toothed cylinder and is centered and fixedly attached below the screw-toothed cylinder. Further embodiments include a rack 200 in which stacked containers can be arranged. The rack can be positioned between and adjacent to the cylinders 120, which rotate the rack and containers so that gravity moves the stacked containers towards the screw-toothed cylinder, where the spiral thread 134 of the screw-toothed cylinder engages with the rims of the stacked containers and moves them towards the semi-circular wedge. A motor 300 can drive a gear set 320 operably attached to the spindles, which rotates the spindles and simultaneously rotates the rack. Each of these general components can have one or more sub-components, which will be discussed in detail below.

The dimensions of a container can determine the number of spindles 105 required to separate the stacked containers. Smaller or more rigid containers may require two spindles, arranged oppositely, while larger or more flexible containers may require more spindles. A spindle can have three sections arranged top to bottom: a rotation cylinder 120, a screw-toothed cylinder 130, and a semi-circular wedge 150. In one embodiment, there is an axis hole 110 through the spindle. The sections of a spindle can be arranged to operate synchronously when rotated. FIG. 1 shows a non-limiting example of a spindle. The rotation cylinder at the top of the spindle can have a diameter that is smaller than the diameter of the screw-toothed cylinder arranged just below. The rotation cylinder can contact or be placed against a rack 200 in which stacked containers are arranged and, when rotated, can simultaneously rotate the rack and the containers therein. In one embodiment, the rotation cylinder has a surface 122 that is efficacious for rotating the rack. FIG. 1 illustrates example spindles with different types of surfaces 122. For example, the surface can be roughened or have ridges or projections or can comprise a material that deforms to increase friction or stiction between the surfaces, such as, for example, a rubber or silicone surface. Other types of surfaces that assist the rotation cylinder in rotating the rack can also be used.

A screw-toothed-cylinder is substantially similar to a screw, in that it has a spiral thread 134, as shown, for example, in FIGS. 1 and 3, arranged to direct the rimmed containers downward when the spindle rotates. Screw threads typically have a pitch, which is the distance between two adjacent edges or crests of the thread, and a depth, which is the distance between the crest and the shank around which the thread turns. In one embodiment, the pitch and depth of the thread are conducive to capturing the rim of one or more containers within a rack and carrying the one or more containers to the bottom of the screw-toothed cylinder. The thread can have a starting end 135 that initially captures the rim of the container and a drop-off end 136 where the rim is released, which is discussed in more detail below. In one embodiment, the pitch and the depth of the thread is such that multiple containers can be carried along the thread to the drop-off end while inhibiting separation of the containers. The frictional forces that hold the containers together can be beneficial until such time as the containers are separated by the semi-circular wedge.

The semi-circular wedge rotated on the spindle 105 can separate a container from the bottom of the stacked containers, as demonstrated for example in FIG. 3. The semi-circular wedge can operate by forcibly increasing the distance between the rims of two adjacent rimmed containers and overcoming the coefficient of friction between the two containers, thereby allowing the containers to part or separate. The semi-circular wedge can increase this distance by pushing the rim of the bottom container away from the rim of the container directly above. In one embodiment, the semi-circular wedge has a substantially horizontal upper side 155 and a slanted bottom side 160 to provide an upside-down curved ramp, as demonstrated, for example, in FIGS. 3 and 4B. The upper end is the higher end or narrow end 170 of the ramp and the wide end 175 is the opposite end with lower end of the ramp. In one embodiment the semi-circular wedge extends partially around the spindle, so that there is an open space or drop area 180 opposite to the semi-circular wedge around the spindle where the ramp does not extend. The angle $\sphericalangle$ between the narrow end and the wide end, as shown, for example, in FIG. 4A can be at least 90°, 95°, 100°, 105°, 110°, 115°, 120°, 125°, 130°, 135°, 140°, 145, 150°, 155°, 160°, 165°, 170°, 175°, and/or 180° or an angle between any two of the listed values. The angle occupied by the semi-circular wedge can determine the angle of the drop area 180 opposite thereto, as demonstrated in FIG. 4A.

Stacked containers can be arranged in a rack 200 with the bottom ends initially directed upwards. The rack can support the stacked containers vertically. In one embodiment, the rack has a bottom end 205 towards which the open ends and rims of the stacked containers are directed, two or more substantially vertical walls 210, and an open end 215 through which the stacked containers fall or exit to be captured by the starting end 135 of the screw-toothed cylinder 130. The rack with the stacked containers can be inverted and placed on at least one, preferably at least two, spindles, so that the vertical walls 210 at the open end 215 are supported on the upper end 132 of the screw-toothed cylinder 130. This also inverts the containers to an upright position, so that the rims are now upwards, above the bottoms of the containers, as shown, for example, in FIG. 3.

Preferably, the vertical walls have a thickness and a diameter that allow the rack to be supported on the one or more screw-toothed cylinders, while not inhibiting and thereby allowing the stacked containers to drop or fall through the open end to be captured by the starting end 135 of the thread 134 of the screw-toothed cylinder 130, which inhibits the stacked containers from falling further than the screw-toothed cylinder. Alternatively, the bottom of the containers can extend past the open end 215 of the rack and when the rack and containers are inverted the bottom end 215 of the rack is above the screw-toothed spindle. The rim of the bottom most container can be similarly captured or engaged with the starting end of the thread, which inhibits the stacked containers from falling further than the screw-toothed cylinder.

The one or more spindles 105 can be rotated by a motor 300 and one or more gear sets 320. In one embodiment, the motorized gear set includes an umbrella gear 330. In a still further embodiment, the motor drives a gear reducer 340 that is operably connected to the umbrella gear to rotate the spindles 105 clockwise or counterclockwise, which simultaneously rotates the rack and stacked containers in the opposite direction. An example of this embodiment is shown in FIG. 1. A person of skill in the art would be able to determine any of a variety of combinations of gears and motors capable of rotating one or more spindles of the subject invention. Such variations are within the scope of the subject invention.

In a specific embodiment the subject invention comprises a motor 300 that drives a gear reducer 340 that rotates an umbrella gear 330. The umbrella gear turns a spindle, which has the rotation cylinder 120, the screw-toothed cylinder 130, and the semi-circular wedge 150 with sloped bottom 160, in a clockwise direction, which simultaneously rotates the rack 200 and the stacked containers, which moves the stacked containers in a top-down direction past the rotation cylinder 120 to engage with the thread 134 of screw-toothed cylinder 130. When the bottom container reaches the drop-off end 136 of the thread of the screw-toothed cylinder 130, friction between adjacent containers inhibits the bottom container from falling off, so that it continues to move downward. The semi-circular wedge 150 with the leading narrow end 170 rotates around so the narrow end can insert into the space between the rims of the two adjacent containers.

The gradual increase in the width of the faster rotating semi-circular wedge, from the narrow end to the wider end, pushes the bottom rim away from the top rim and increases the space therebetween, because the rotational speed of the semi-circular wedge is greater than that of the container. As the rims separate, and the wide end of the semi-circular wedge rotates out of the space between the rims, the bottom container separates from the stacked containers and falls or drops down through the drop area opposite to the semi-circular wedge.

Rimmed containers are used in a variety of industries. Such containers are usually stacked one within another and must be separated before use. A separation apparatus of the subject invention can advantageously operate automatically and continuously to separate the individual containers, which can improve efficiency and lower costs of using such containers.

I claim:

1. A container separator apparatus, configured to separate containers from a plurality of stacked rimmed containers, comprising:
    at least one rotatable spindle comprising,
        a screw-toothed cylinder comprising a spiral thread, configured to engage with a rim of a container of the plurality of stacked containers,
        a rotation cylinder fixedly attached above the screw-toothed cylinder,
        a semi-circular wedge comprising a sloped bottom side that forms a narrow end and a wide end with a drop area between the narrow end and the wide end, wherein the semi-circular wedge is fixedly attached below the screw-toothed cylinder, and synchronously operates with the screw-toothed cylinder,
    a rack, configured to at least partially contain the plurality of stacked containers, comprising at least one vertical wall that defines an opening at a bottom end, wherein the rack is inverted and positioned with the at least one vertical wall against the rotation cylinder,
    a motorized gear set comprising a motor operably connected to a gear set that is operably connected to the at least one spindle, such that activation of the motor rotates the gear set, which simultaneously rotates the at least one spindle,
    such that rotation of the at least one spindle simultaneously rotates the inverted rack and the plurality of stacked containers therein are moved by the screw-toothed cylinder towards the semi-circular wedge, which inserts at the narrow end and rotates between the rims of two adjacent containers so the sloped bottom side pushes against and separates a bottom container from the plurality of stacked containers.

2. The container separator apparatus according to claim 1, wherein the gear set further comprises an umbrella gear that rotates the at least one screw-toothed cylinder clockwise or counterclockwise.

3. The container separator apparatus according to claim 1, wherein the at least one vertical wall of the rack, when inverted, is supported on an upper end of the screw-toothed cylinder with an open end directed towards the screw-toothed cylinder.

4. A method for separating a container from a plurality of stacked containers, the method comprising:
- a) obtaining a container separator apparatus, according to claim 1;
- b) utilizing a rack to engage the plurality of stacked containers with at least one rotatable spindle;
- c) activating a motorized gear set to rotate the at least one rotatable spindle, so as to move the plurality of stacked containers downward;
- d) separating a bottom container from the plurality of stacked containers with the rotatable spindle;
- g) allowing the bottom container to fall; and
- h) repeating steps d and g.

\* \* \* \* \*